US012730589B2

(12) United States Patent
Qi et al.

(10) Patent No.: US 12,730,589 B2
(45) Date of Patent: Sep. 8, 2026

(54) DATA STORAGE METHOD, STORAGE APPARATUS AND HOST

(71) Applicant: SAMSUNG ELECTRONICS CO., LTD., Suwon-si (KR)

(72) Inventors: Bei Qi, XiAn (CN); Kun Zhang, XiAn (CN); Kun Dou, XiAn (CN); Ruyi Zhang, XiAn (CN); Zongyuan Zhang, XiAn (CN); Yutao Li, XiAn (CN); Dan Cao, XiAn (CN); Tianyi Zhang, XiAn (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/952,134

(22) Filed: Nov. 19, 2024

(65) Prior Publication Data

US 2025/0077127 A1 Mar. 6, 2025

Related U.S. Application Data

(63) Continuation of application No. 18/124,290, filed on Mar. 21, 2023, now Pat. No. 12,164,809.

(30) Foreign Application Priority Data

Sep. 8, 2022 (CN) ......................... 202211105968.1

(51) Int. Cl.
*G06F 3/06* (2006.01)

(52) U.S. Cl.
CPC ............ *G06F 3/0659* (2013.01); *G06F 3/061* (2013.01); *G06F 3/0647* (2013.01); *G06F 3/0683* (2013.01)

(58) Field of Classification Search
CPC ...... G06F 3/061; G06F 3/0611; G06F 3/0647; G06F 3/0659; G06F 3/0679; G06F 3/0683
See application file for complete search history.

(56) References Cited

U.S. PATENT DOCUMENTS 7,206,866 B2 4/2007 Hendel et al.
8,468,318 B2 6/2013 Colgrove et al.
(Continued)

FOREIGN PATENT DOCUMENTS

CN 110888937 3/2020
CN 107066498 4/2020
(Continued)

OTHER PUBLICATIONS

Siying Dong, "Option of Compaction Priority", https://rocksdb.org/blog/2016/01/29/compaction_pri.html.
(Continued)

*Primary Examiner* — Yong J Choe
(74) *Attorney, Agent, or Firm* — Morgan, Lewis & Bockius LLP

(57) ABSTRACT

A data storage method includes: in response to a stream ID carried by an IO write request of a host satisfying a first preset condition, writing data corresponding to the IO write request into a first storage unit; and in response to the stream ID carried by the IO write request satisfying a second preset condition, writing the data corresponding to the IO write request into a second storage unit, wherein the stream ID indicates write latency requirement information of the data corresponding to the IO write request, wherein a data write latency indicated by the stream ID satisfying the first preset condition is less than the data write latency indicated by the stream ID satisfying the second preset condition, wherein a read and write performance of the first storage unit is higher than the read and write performance of the second storage unit.

20 Claims, 11 Drawing Sheets

(56) References Cited

U.S. PATENT DOCUMENTS

| | | | | |
|---|---|---|---|---|
| 9,032,165 | B1 | 5/2015 | Brooker | |
| 9,043,512 | B1 | 5/2015 | Merchant | |
| 9,348,747 | B2 | 5/2016 | Keeler et al. | |
| 12,175,088 | B2 * | 12/2024 | Ramanathan | G06F 3/0659 |
| 2014/0223084 | A1 * | 8/2014 | Lee | G06F 12/0253<br>711/103 |
| 2016/0162187 | A1 * | 6/2016 | Lee | G06F 3/0688<br>711/103 |
| 2017/0262202 | A1 * | 9/2017 | Seo | G06F 3/0619 |
| 2018/0088827 | A1 * | 3/2018 | Shu | G06F 3/0688 |
| 2018/0260136 | A1 * | 9/2018 | Huo | G06F 3/0659 |
| 2018/0285012 | A1 | 10/2018 | Kazama et al. | |
| 2018/0373626 | A1 | 12/2018 | Sun et al. | |
| 2021/0081121 | A1 | 3/2021 | Curewitz et al. | |
| 2021/0124653 | A1 * | 4/2021 | Weng | G06F 3/0653 |
| 2023/0289061 | A1 * | 9/2023 | Stoica | G06F 3/0679 |
| 2024/0086110 | A1 | 3/2024 | Qi et al. | |
| 2024/0143231 | A1 * | 5/2024 | Chen | G06F 3/0688 |
| 2025/0348424 | A1 * | 11/2025 | Han | G06F 12/0223 |

FOREIGN PATENT DOCUMENTS

| | | |
|---|---|---|
| CN | 112035065 | 12/2020 |
| JP | 2018-169941 | 11/2018 |
| KR | 10-1686340 | 12/2016 |

OTHER PUBLICATIONS

Billy Tallis, "NAND Flash Updates from ISSCC_ The Leaning Towers of TLC and QLC", Feb. 19, 2021, https://www.anandtech.com/show/16491/flash-memory-at-isscc-2021.

Siying Dong, et al., "Optimizing Space Amplification in RocksDB", CIDR, 2017.

Niv Dayan, et al. "Dostoevsky: Better Space-Time Trade-Offs for LSM-Tree Based Key-Value Stores via Adaptive Removal of Superfluous Merging", Harvard University, 2018.

* cited by examiner

Write latency =
Latency of writing +
Latency of writing data

FIG. 3

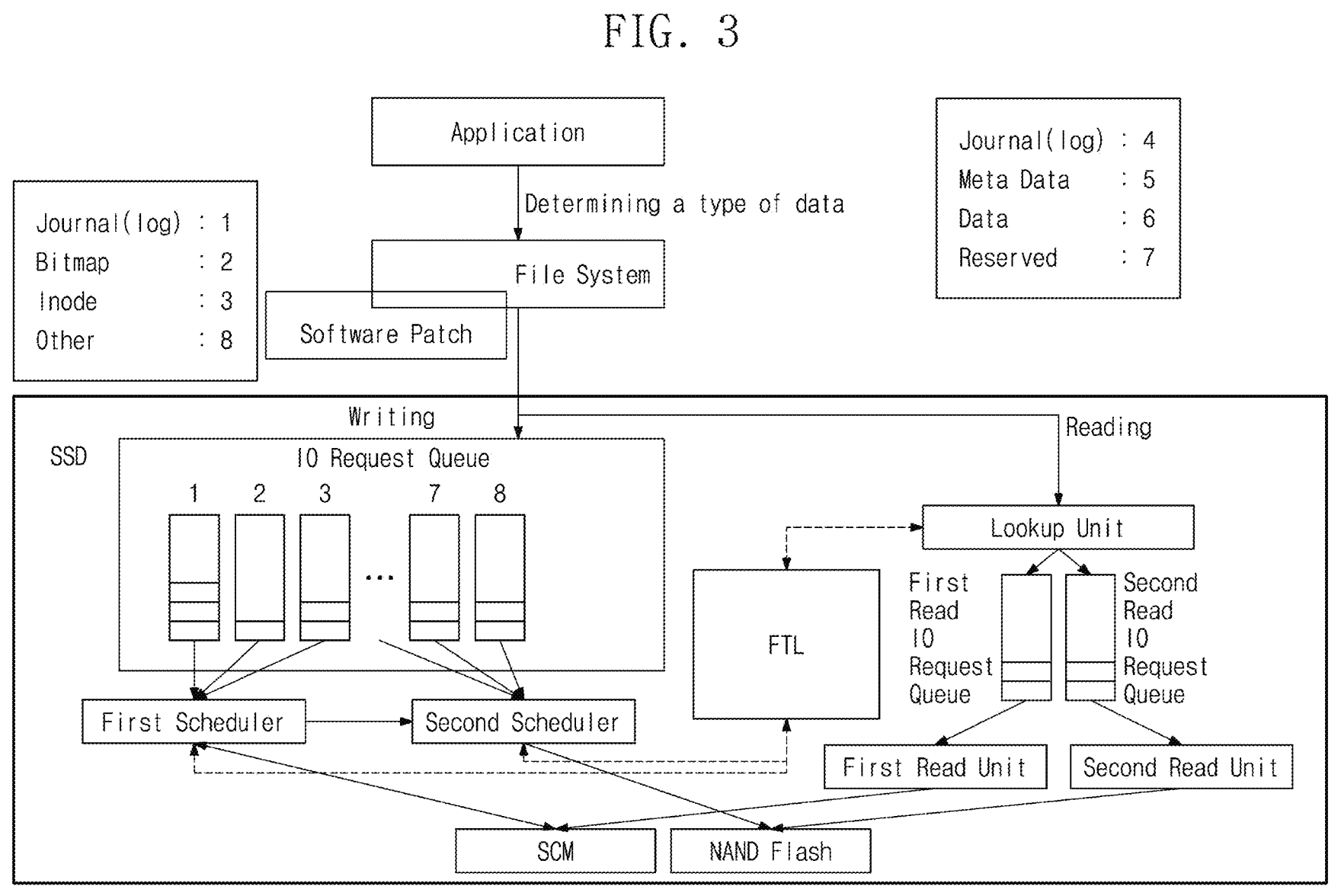

Application
Determining a type of data
File System
Software Patch
Journal(log) : 1
Bitmap : 2
Inode : 3
Other : 8
Journal(log) : 4
Meta Data : 5
Data : 6
Reserved : 7
SSD
Writing
Reading
IO Request Queue
1
2
3
...
7
8
First Scheduler
Second Scheduler
FTL
Lookup Unit
First Read IO Request Queue
Second Read IO Request Queue
First Read Unit
Second Read Unit
SCM
NAND Flash 1300
1330a
1331a
STRG CTRL
1332a
NVM
1330b
1331b
STRG CTRL
1332b
NVM
1310
1311
CPU Core
1312
Controller
1313
Accelerator
1320a
Memory
1320a
Memory
1410
Image Capturing Device
1420
User Input Device
1430
Sensor
1440
Communication Device
1450
Display
1460
Speaker
1470
Power Supplying Device
1480
Connecting Interface

DATA STORAGE METHOD, STORAGE APPARATUS AND HOST

CROSS-REFERENCE TO RELATED APPLICATIONS

This application is a continuation of U.S. patent application Ser. No. 18/124,290 filed on Mar. 21, 2023, which claims priority under 35 U.S.C. § 119 to Chinese Patent Application No. 202211105968.1, filed on Sep. 8, 2022, the disclosures of which are incorporated by reference herein in their entireties.

TECHNICAL FIELD

The present inventive concept relates to a technical field of memory, and more particularly, to a data storage method, a storage apparatus and a host.

DISCUSSION OF THE RELATED ART

A write operation for a storage apparatus performed by a file system (File System) of a host usually performs different operations and responses according to different IO data types. Usually, for application data of a user, a memory is used to complete the write operation for writing the data to the storage apparatus. For example, a normal write operation will receive a return notification after writing the data to the memory, and the data written to the memory will be uniformly flushed into a NAND flash memory. However, for a journal type of data used to guarantee data consistency, an operating system can call a fsync write operation to ensure that the return notification will not be received until the data is written to the NAND flash memory.

Some common database applications (for example, RocksDB, InnoDB, etc.) have write requests for both the application data of the user and the journal type of data. Generally, when there is database data to be written, a Write Ahead Log (WAL) may be written first. When the WAL is successfully flushed into the NAND, the database data will be written into the memory, and then the return notification may be generated. The data cached in the memory will be flushed into the NAND after a condition is satisfied.

At the same time, not only the database application itself has log data, but the file system may also generate the log data, metadata, etc. and perform the corresponding write operation during a process of writing the data to the storage apparatus. The writing of this data will also affect the write latency of the database data. For example, when an application creates a /foo/bar file (create (/foo/bar)), in addition to the write operation for data blocks (e.g., root data, foo data, bar data) of the bar file, a large amount of read/write operations (read/write) for the metadata (e.g., data bitmap, inode bitmap, root inode, foo inode, bar inode) may be performed.

How to improve the write latency of the WAL, the log data, metadata of the file system etc. and then improve the write latency of upper-layer application data, is a problem that should be solved.

SUMMARY

The present inventive concept provides a data storage method, a storage apparatus and a host, which can be capable of reducing data write latency and increase data throughput effectively.

According to an embodiment of the present inventive concept, a data storage method includes: in response to a stream ID carried by an IO write request of a host satisfying a first preset condition, writing data corresponding to the IO write request into a first storage unit of a storage apparatus; and in response to the stream ID carried by the IO write request satisfying a second preset condition, writing the data corresponding to the IO write request into a second storage unit of the storage apparatus, wherein the stream ID indicates write latency requirement information of the data corresponding to the IO write request, wherein a data write latency indicated by the stream ID satisfying the first preset condition is less than the data write latency indicated by the stream ID satisfying the second preset condition, wherein a read and write performance of the first storage unit is higher than the read and write performance of the second storage unit.

According to an embodiment of the present inventive concept, a data storage method includes: in response to an IO write request that is to be sent to a storage apparatus, determine a type of data corresponding to the IO write request; determine a stream ID corresponding to the IO write request based on the type of the data; and sending the IO write request that is carrying the stream ID to the storage apparatus, so that the storage apparatus stores data corresponding to the IO write request in a first storage unit of the storage apparatus when determining that the stream ID satisfies a first preset condition and stores the data corresponding to the IO write request in a second storage unit of the storage apparatus when determining that the stream ID satisfies a second preset condition; wherein the stream ID indicates write latency requirement information of the data corresponding to the IO write request, wherein a data write latency indicated by the stream ID satisfying the first preset condition is less than the data write latency indicated by the stream ID satisfying the second preset condition, wherein a read and write performance of the first storage unit is higher than the read and write performance of the second storage unit.

According to an embodiment of the present inventive concept, a storage apparatus supporting multi-stream includes: a data writing unit configured to: in response to a stream ID carried by the IO write request of a host satisfying a first preset condition, write data corresponding to an IO write request into a first storage unit of the storage apparatus, and in response to the stream ID carried by the IO write request satisfying a second preset condition, write data corresponding to the IO write request into a second storage unit of the storage apparatus, wherein the stream ID indicates write latency requirement information of the data corresponding to the IO write request, wherein a data write latency indicated by the stream ID satisfying the first preset condition is less than the data write latency indicated by the stream ID satisfying the second preset condition, wherein a read and write performance of the first storage unit is higher than the read and write performance of the second storage unit.

According to an embodiment of the present inventive concept, a host includes: a data type determining unit configured to: in response to an IO write request that is to be sent to a storage apparatus, determine a type of data corresponding to the IO write request, wherein the storage apparatus includes a first storage unit and a second storage unit and supports multi-stream; a stream ID determining unit configured to: determine a stream ID corresponding to the IO write request based on the type of the data; and a sending unit configured to: send the IO write request carrying the stream ID to the storage apparatus, so that the storage apparatus stores data corresponding to the IO write request in the first storage unit when determining that the stream ID satisfies a first preset condition and stores the data corresponding to the IO write request in the second storage unit when determining that the stream ID satisfies a second preset condition, wherein the stream ID indicates write latency requirement information of the data corresponding to the IO write request, wherein a data write latency indicated by the stream ID satisfying the first preset condition is less than the data write latency indicated by the stream ID satisfying the second preset condition, and wherein a read and write performance of the first storage unit is higher than the read and write performance of the second storage unit.

BRIEF DESCRIPTION OF THE DRAWINGS

The above and other features of the present inventive concept will become more apparent by describing in detail exemplary embodiments thereof, with reference to the accompanying drawings, in which:

FIG. 3 is a diagram illustrating an application example of a data storage method according to an embodiment of the present inventive concept;

DETAILED DESCRIPTION OF THE EMBODIMENTS

Figure 1:
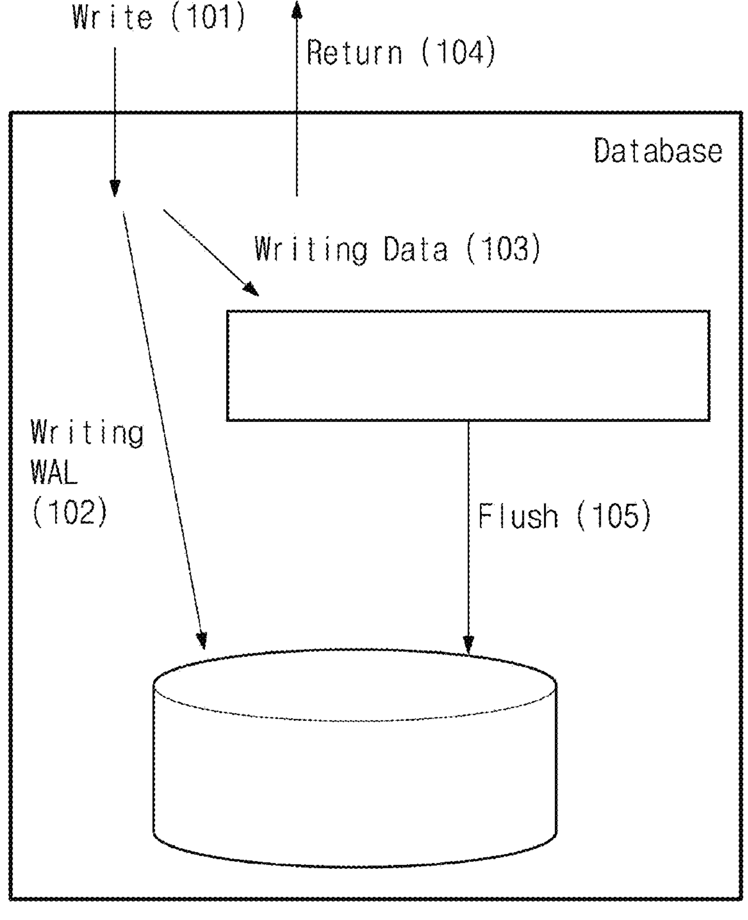
FIG. 1 is a diagram illustrating an example of a write operation of a database application.

Hereinafter, various embodiments of the present inventive concept are described with reference to the accompanying drawings, in which like reference numerals are used to depict the same or similar elements, features, and structures. However, the present inventive concept is not intended to be limited by the various embodiments described herein, and it is intended that the present inventive concept covers all modifications, equivalents, and/or alternatives of the present inventive concept, provided they come within the spirit and scope of the present inventive concept.

It is to be understood that the singular forms include plural forms, unless the context clearly dictates otherwise.

For example, the expressions "A or B," or "at least one of A and/or B" may indicate A and B, and A or B. For instance, the expression "A or B" or "at least one of A and/or B" may indicate (1) A, (2) B, or (3) both A and B.

It is to be understood that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The present inventive concept provides a data storage method, a storage apparatus and a host. According to an embodiment of the present inventive concept, a write IO request about data (hereinafter called "IO write request") can be assigned different ID (i.e., a stream ID) according to a type of the data. For example, an application can determine the ID of the IO write request according to the type of data it generates, and a file system can also determine the ID of the IO write request according to the type of data it generates. The IDs of the IO write request determined by the application and the file system are different from each other.

The storage apparatus may be a storage apparatus supporting multi-stream (Multi-Stream), and the storage device may be composed of a first storage unit with a higher read/write speed and a second storage unit with a lower read/write speed. For example, the first storage unit with the higher read/write speed may be a storage class memory (SCM), and the second storage unit with the lower read/write speed may be a NAND flash memory. Here, the first storage unit and the second storage unit are not limited to the above-mentioned SCM and NAND flash memory, but other memories may be used to implement the first storage unit and the second storage unit, as long as the read/write speed of the first storage unit is higher than that of the second storage unit storage unit. The storage apparatus can write the data with a higher requirement for write latency into the SCM, and write the data with a lower requirement for write latency into the NAND flash memory according to the ID of the IO write request.

In addition, when the SCM is full, the data on the SCM can be replaced to the NAND flash memory according to a replacement algorithm to ensure that the data with the higher requirement for write latency can still be written to the SCM.

In addition, when a write queue for the data with the higher requirement for write latency is too deep, the data with the longest waiting time in the write queue or the data with the lowest read possibility can be written into the NAND flash memory, thereby reducing the write latency of the data, and it is ensured that the SCM are read more, thereby reducing a read latency of the data.

FIG. 1 is a diagram illustrating an example of a write operation of a database application. As shown in FIG. 1, when there is database data to be written (101), to ensure the data consistency, a Write Ahead Log (WAL) will be written first (102). When the WAL is successfully flushed into the NAND, the database data will be written into the memory (103), and then the return notification is returned (104). Next, the data cached in the memory will be flushed into the NAND after a trigger condition is satisfied (105). From a user's view point, a write latency of the database data is equal to the time for writing the WAL to the NAND plus the time for writing the database data to the memory. Therefore, the time for writing the WAL to the NAND may affect a writing performance of the database data.

Figure 2:
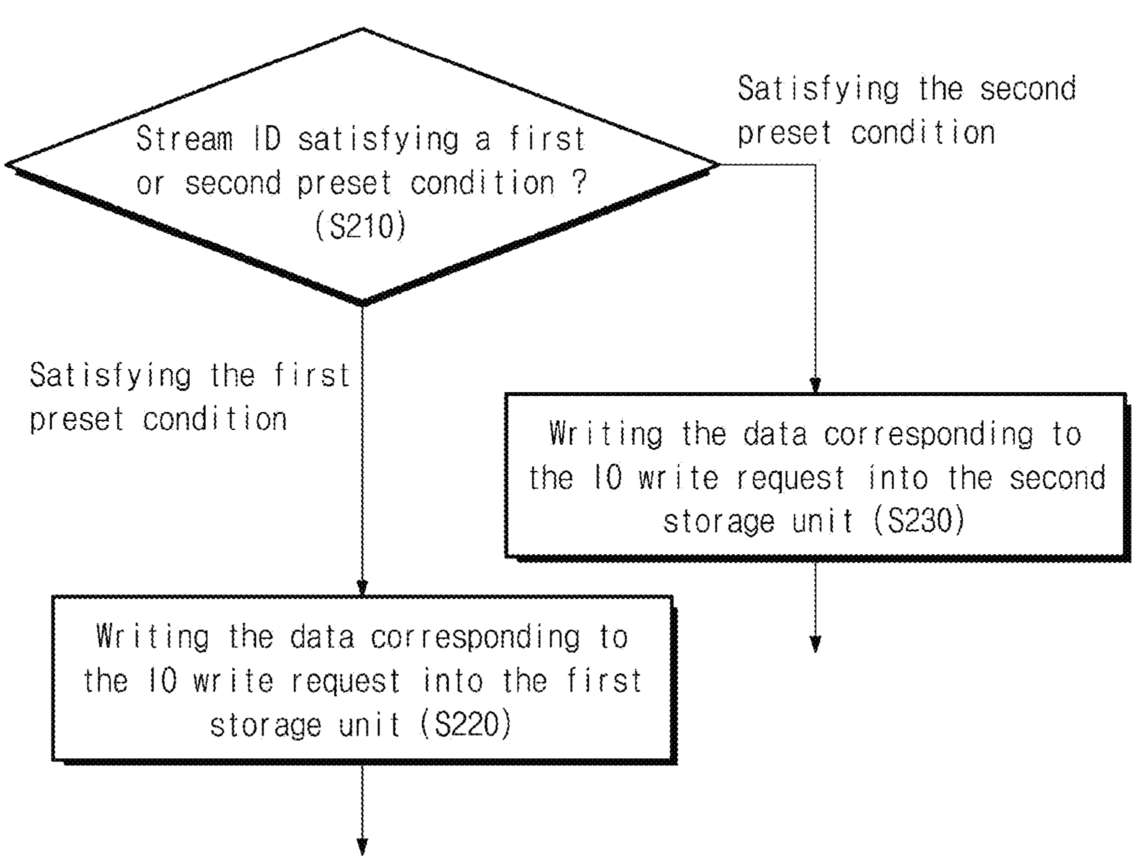
FIG. 2 is a flowchart illustrating a data storage method according to an embodiment of the present inventive concept.

FIG. 2 is a flowchart illustrating a data storage method according to an embodiment of the present inventive concept, and FIG. 3 is a diagram illustrating an application example of a data storage method according to an embodiment of the present inventive concept. In this embodiment, the data storage method can be performed by a storage apparatus (for example, a memory controller), but it is not limited thereto. In this embodiment, the data storage method is applied to a storage apparatus supporting multi-stream. The storage apparatus may include a first storage unit and a second storage unit, and a read/write performance of the first storage unit is higher than that of the second storage unit. For example, the first storage unit may be an SCM, and the second storage unit may be a NAND flash memory.

Referring to FIG. 2, in step S210, it can be determined whether a stream ID carried in an IO write request of a host satisfies a first preset condition or a second preset condition. The stream ID indicates write latency requirement information of data corresponding to the IO write request, and a data write latency indicated by the stream ID satisfying the first preset condition is less than the data write latency indicated by the stream ID satisfying the second preset condition.

In step S220, in response to the stream ID satisfying the first preset condition, the data corresponding to the IO write request may be written into the first storage unit. In step S230, in response to the stream ID satisfying the second preset condition, the data corresponding to the IO write request may be written into the second storage unit.

For example, in step S220, in response to the stream ID satisfying the first preset condition, the IO write request may be written into a first IO request queue. Then, the data corresponding to the IO write request may be written into the first storage unit, by scheduling the first IO request queue via a first scheduler provided in the storage apparatus. In addition, in step S230, in response to the stream ID satisfying the second preset condition, the IO write request may be written into a second IO request queue. Then, the data corresponding to the IO write request may be written into the second storage unit, by scheduling the second IO request queue via a second scheduler provided in the storage apparatus. As shown in FIG. 3, the storage apparatus may include a plurality of IO request queues, and the stream IDs carried by the IO write requests included in each IO request queue are the same. The ID of the IO write request may be determined by an application and/or a file system that generates the IO write request according to a type of data corresponding to the IO write request. According to an embodiment of the present inventive concept, whenever the IO write request is received, the received IO write request may be added to a corresponding IO request queue among the plurality of IO request queues. The plurality of IO request queues may be divided into the first IO request queue scheduled by the first scheduler and the second IO request queue scheduled by the second scheduler according to the steam IDs.

Figure 4:
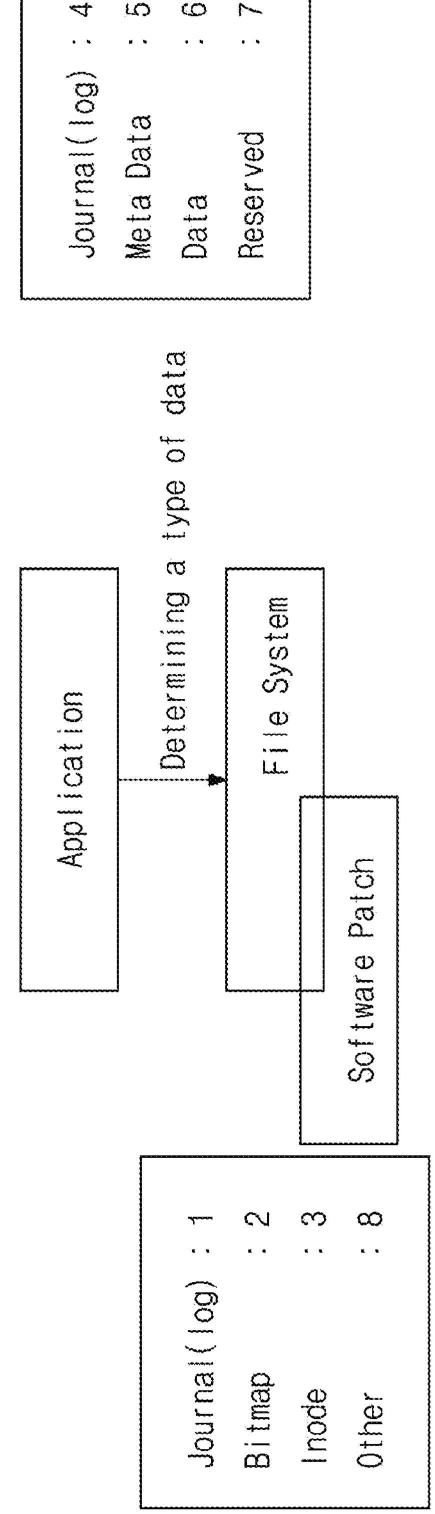
FIG. 4 is a diagram illustrating an example of determining a type of data and an ID value of an IO write request thereof.

FIG. 4 is a diagram illustrating an example of determining a type of data and an ID value of an IO write request thereof. Referring to FIG. 4, the type of the data includes log data of a file system, Bitmap data of the file system, Inode data of the file system, log data of a user, metadata of the user, application data of the user, other data of the file system, and other user data.

The type of the data generated by the application may be determined as the log data (Journal(log)) of a user, metadata (Metadata) of the user, application data (Data) of the user, and other user data (Reserved).

The type of the data generated by the file system may be determined as log data (Journal(log)) of a file system, Bitmap data of the file system, and Inode data of the file system.

In addition, the data of an undetermined type of the application and/or the file system may be determined as the other data of the file system.

As shown in FIG. 4, the type of the data generated by the file system can be determined, for example, by its software patch, but the present inventive concept is not limited thereto. According to an embodiment of the present inventive concept, the above data types are only examples, and the types of the data generated by the application program and the file system may be determined as different types of data according to actual needs.

According to an embodiment of the present inventive concept, various data types can be assigned different Stream ID values, i.e., stream IDs. For example, IO write requests corresponding to the log data of the file system, the Bitmap data of the file system, the Inode data of the file system, the log data of the user, the metadata of the user, the application data of the user, the other user data and the other data of the file systems are given different IDs, and ID values increase in turn. The smaller the ID value is, the higher a requirement for write latency of the corresponding IO write request is, which requires a priority processing; and the larger the ID value is, the lower the requirement for the write latency of the corresponding IO write request is.

As shown in FIG. 4, for example, the ID values given to the IO write requests corresponding to the log data of the user, the metadata of the user, the application data of the user, and the other user data are 4, 5, 6, 7, respectively. The ID values given to the log data of the file system, the Bitmap data of the file system, the Inode data of the file system, and the other data of the file systems are 1, 2, 3, 8, respectively. The ID values of the IO write requests from small to large indicate that the corresponding data has a decreasing requirement for the write latency.

According to an embodiment of the present inventive concept, the application may provide a user interface, so that the user can directly determine the type of the data or the ID value of the IO write request. For example, the user may determine the ID value of the IO write request as 4, 5, 6, or 7 through the user interface. For example, the user can determine the ID values of the IO write requests corresponding to the log data of the user, the metadata of the user, the application data of the user, and the other user data as 4, 5, 6, 7, respectively, through the user interface. In addition, the file system can use a stream instruction to determine the ID value of the IO write request. For example, the file system may determine the ID values of the IO write requests corresponding to the log data of the file system, the Bitmap data of the file system, and the Inode data of the file system as 1, 2, 3, respectively, and continue to use the ID value of the IO write request determined by the application/user. Furthermore, if the type of the data is not determined by the application/user, the file system may determine the ID value of the IO write request corresponding to the data to be 8. For example, various types of data generated by the file system and various types of data generated by the application can also be determined by the file system, which is not specifically limited. For example, section 9.3 of the NVME standard version 1.3 specifically describes the stream instruction, which will not be repeated here.

Figure 5:
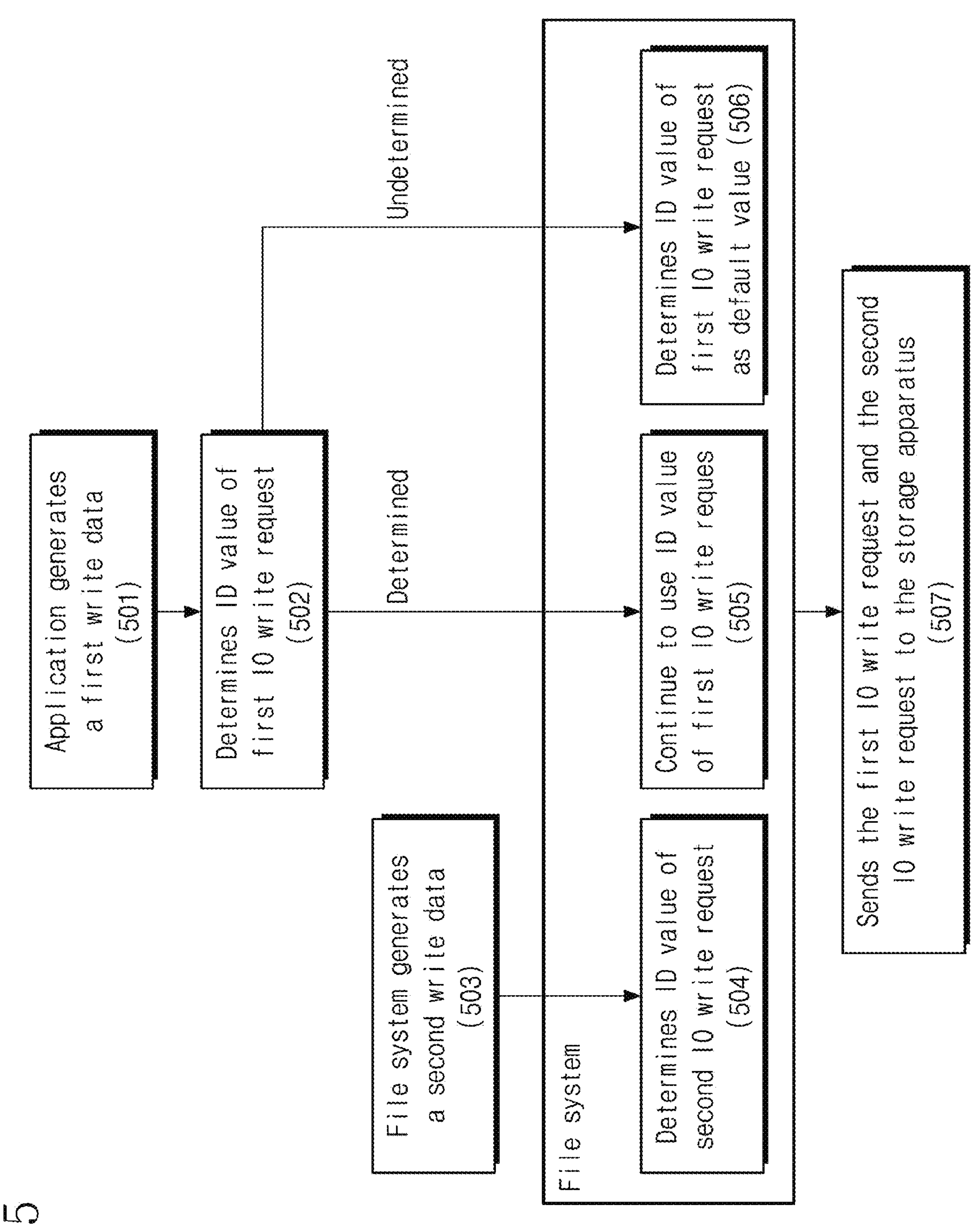
FIG. 5 is a diagram illustrating an example in which a host generates an IO write request and sends the IO write request to a storage apparatus according to an embodiment of the present inventive concept.

FIG. 5 is a diagram illustrating an example in which a host generates an IO write request and sends the IO write request to a storage apparatus according to an embodiment of the present inventive concept.

Referring to FIG. 5, in step 501, an application of the host generates first write data, and generates a first IO write request corresponding to the first write data. In step 502, the application determines an ID value (e.g., 4, 5, 6, and 7) of the first IO write request according to a type of the generated first write data. In step 503, the file system of the host generates second write data, and generates a second IO write request corresponding to the second write data. In step 504, the file system determines an ID value (e.g., 1, 2, and 3) of the second IO write request according to the type of the generated second write data. In addition, in step 505, as for the first IO write request whose ID value has been determined by the application, the file system continues to use the ID value of the first IO write request, and in step 506, as for the first IO write request whose ID value has not been determined by the application, the file system determines the ID value of the first IO write request as a default value (e.g. 8). Then, in step 507, the file system sends the first IO write request and the second IO write request to the storage apparatus.

According to an embodiment of the present inventive concept, a plurality of IO request queues may include a plurality of first IO request queues and a plurality of second IO request queues. The ID values of the IO write requests included in each of the first IO request queue are within a first preset range, and the ID values of the IO write requests included in each second IO request queue are within a second preset range. Here, the ID values within the first preset range are smaller than the ID values within the second preset range. For example, the ID value of the IO write request corresponding to the log data of the file system, the Bitmap data of the file system, the Inode data of the file system, the log data of the user, and the metadata of the user satisfies a first preset condition, and the ID value of the IO write request corresponding to the application data of the user, other data of the file system, and the other user data satisfies a second preset condition. For example, a value range of the first preset condition is [1, 5], and the value range of the second preset condition is [6, 8]. The first preset condition and the second preset condition as described above are only examples, and the value ranges of the first preset condition and the second preset condition are not limited thereto. Since the plurality of IO request queues may include the plurality of first IO request queues and the plurality of second IO request queues, in step S210, a round-robin scheduling may be performed on the plurality of first IO request queues, and the round-robin scheduling may be performed on the plurality of second IO request queues. As shown in FIG. 3, a first scheduler provided in the storage apparatus is used to perform the round-robin scheduling on the plurality of first IO request queues, and a second scheduler provided in the storage apparatus is used to perform the round-robin scheduling on the plurality of second IO request queues.

According to an embodiment of the present inventive concept, when the plurality of first IO request queues are polled, the plurality of first IO request queues may be polled according to a weight of each first IO request queue. For example, a corresponding weight may be assigned to the IO write request in the first IO request queue based on a stream ID carried by the IO write request. For example, the higher a write latency requirement of the data corresponding to the IO write request indicated by the stream ID is, the greater the weight corresponding to the IO write request is. For example, the smaller the stream ID of the IO write request is, the larger its weight value is. After the corresponding weight is assigned to each IO write request in the first IO request queue, the first IO request queue may be scheduled by the first scheduler in a round-robin manner according to the weight of the IO write request. Here, since the stream IDs of the IO write requests included in each first IO request queues are the same, each first IO request queue may have a same weight as the IO write requests therein. That is to say, the smaller the ID value of the IO write request included in the first IO request queue is, the greater the weight thereof is. The greater the weight of the first IO request queue, the more polling time slots allocated to the first IO request queue within a unit time is, and thus the first IO request queue is polled more times within a unit time. On the other hand, the second scheduler may also poll the plurality of second IO request queues according to the weight of each second IO request queue. For example, the smaller the ID value of the IO write request included in the second IO request queue is, the greater the weight thereof is.

As shown in FIG. 3, the first scheduler is used to poll the plurality of first IO request queues, and write the data corresponding to the IO request in the first IO request queue which is polled currently into the first storage unit. The second scheduler is used to poll the plurality of second IO request queues, and write the data corresponding to the IO request in the second IO request queue which is polled currently into the second storage unit. In addition, as shown in FIG. 3, the storage apparatus may include a Flash Translation Layer (FTL), and the FTL may have a mapping table reflecting a mapping relationship between logical addresses and physical addresses of the data. During a data write operation, the mapping table may be updated, and during a data read operation, the mapping table may be referenced.

Operation of writing the data into the first storage unit or the second storage unit is further described below. For example, the first scheduler may monitor whether the first storage unit is full. In response to the first storage unit not being full, the first scheduler may write data corresponding to the IO write request in the first IO request queue which is polled currently into the first storage unit. In addition, in response to determining that the first storage unit is full, the first scheduler reads migrated data from the first storage unit according to a preset rule, and writes the migrated data into the second IO request queue. Further, in response to determining that the first storage unit is full, the second scheduler may schedule the second IO request queue, and write the migrated data into the second storage unit. Here, the preset rule may be a least recently used (LRU) rule. In addition, the migrated data may be deleted from the first storage unit while the migrated data is written into the second storage unit.

According to an embodiment of the present inventive concept, when the data corresponding to the IO write request in the first IO request queue, which is polled currently, is written into the first storage unit, a depth of the first IO request queue can be monitored. In response to the depth of the first IO request queue being greater than a preset depth value, the first scheduler may write the IO write request whose write latency exceeds a preset latency value in the first IO request queue from the first IO request queue into the second IO request queue. Thereafter, the second scheduler may schedule the second IO request queue, and write the data corresponding to the IO write request whose write latency exceeds the preset latency value (i.e., the IO write request written from the second IO request queue in the first IO request queue) into to the second storage unit.

According to an embodiment of the present inventive concept, FIG. 3 also schematically illustrates an example of a data read operation. As shown in FIG. 3, when an IO read request is received, a lookup unit provided in the storage apparatus may determine that data corresponding to the IO read request is stored in the first storage unit or the second storage unit, by referring to the mapping table in the FTL based on address information contained in the IO read request. If the data corresponding to the IO read request is stored in the first storage unit, the lookup unit may add the IO read request to a first read IO request queue, and if the data corresponding to the IO read request is stored in the second storage unit, the lookup unit may add the IO read request to a second read IO request queue. A first read unit provided in the storage apparatus may read the corresponding data from the first storage unit based on the first IO read request in the first read IO request queue, and a second read unit provided in the storage apparatus may read the corresponding data from the second storage unit based on the second IO read request in the second read IO request queue.

The data storage method according to the embodiment of the present inventive concept can utilize storage media with different latency to store the data according to different requirements of the data for the write latency. For example, for an operation having a higher requirement for the write latency, a storage medium with a faster read/write speed (for example, the SCM) can be used to store the data, thereby increasing service quality. In addition, for an operation having a higher throughput requirement, a mass storage medium (for example, the NAND flash memory) can be used to store the data. In this way, the number of operation per unit of time can be increased for applications where clients writing data are limited and the amount of data to be written is not a bottleneck.

Figure 6:
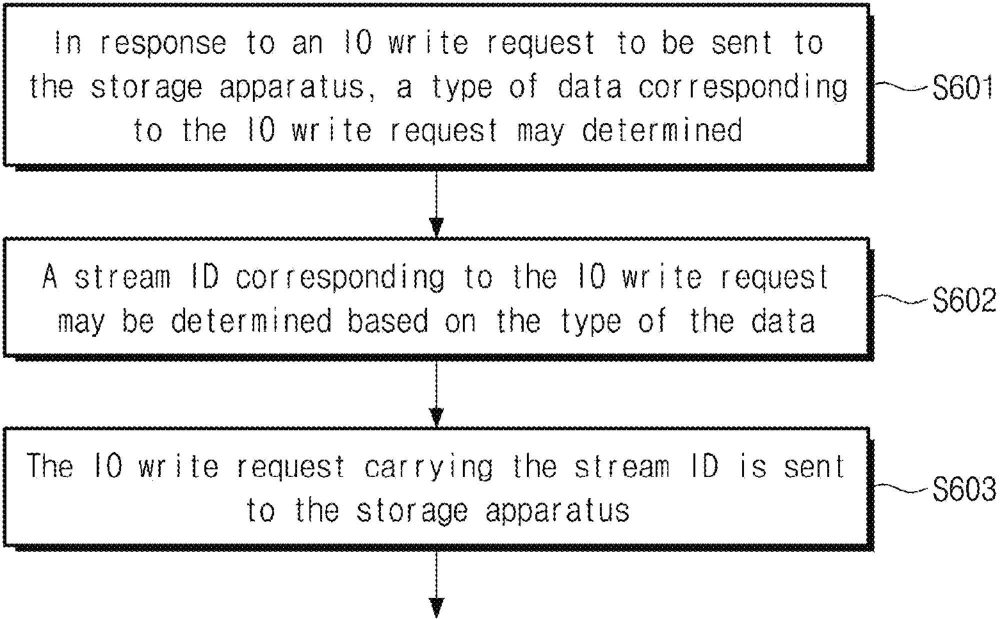
FIG. 6 is a flowchart illustrating a data storage method according to an embodiment of the present inventive concept.

FIG. 6 is a flowchart illustrating a data storage method according to an embodiment of the present inventive concept. In this embodiment, the data storage method can be performed by a host (for example, a host controller), but the present inventive concept is not limited thereto. In this embodiment, the data storage method is applied to a storage apparatus supporting multi-stream. The storage apparatus may include a first storage unit and a second storage unit, and a read/write performance of the first storage unit is higher than that of the second storage unit.

Referring to FIG. 6, in step S601, in response to an IO write request that is to be sent to the storage apparatus, a type of data corresponding to the IO write request may be determined. In step S602, a stream ID corresponding to the IO write request may be determined based on the type of the data. In step S603, the IO write request carrying the stream ID may be sent to the storage apparatus, so that the storage apparatus stores data corresponding to the IO write request in the first storage unit when determining that the stream ID satisfies a first preset condition and stores the data corresponding to the IO write request in the second storage unit when determining that the stream ID satisfies a second preset condition. According to an embodiment of the present inventive concept, the stream ID indicates write latency requirement information of the data corresponding to the IO write request, and a data write latency indicated by the stream ID satisfying the first preset condition is less than the data write latency indicated by the stream ID satisfying the second preset condition.

According to an embodiment of the present inventive concept, a data type associated with the stream ID satisfying the first preset condition may include: log data of a file system, Bitmap data of the file system, Inode data of the file system, log data of a user, and metadata of the user. A data type associated with the stream ID satisfying the second preset condition may include: application data of the user, other data of the file systems, and other user data.

Figure 7:
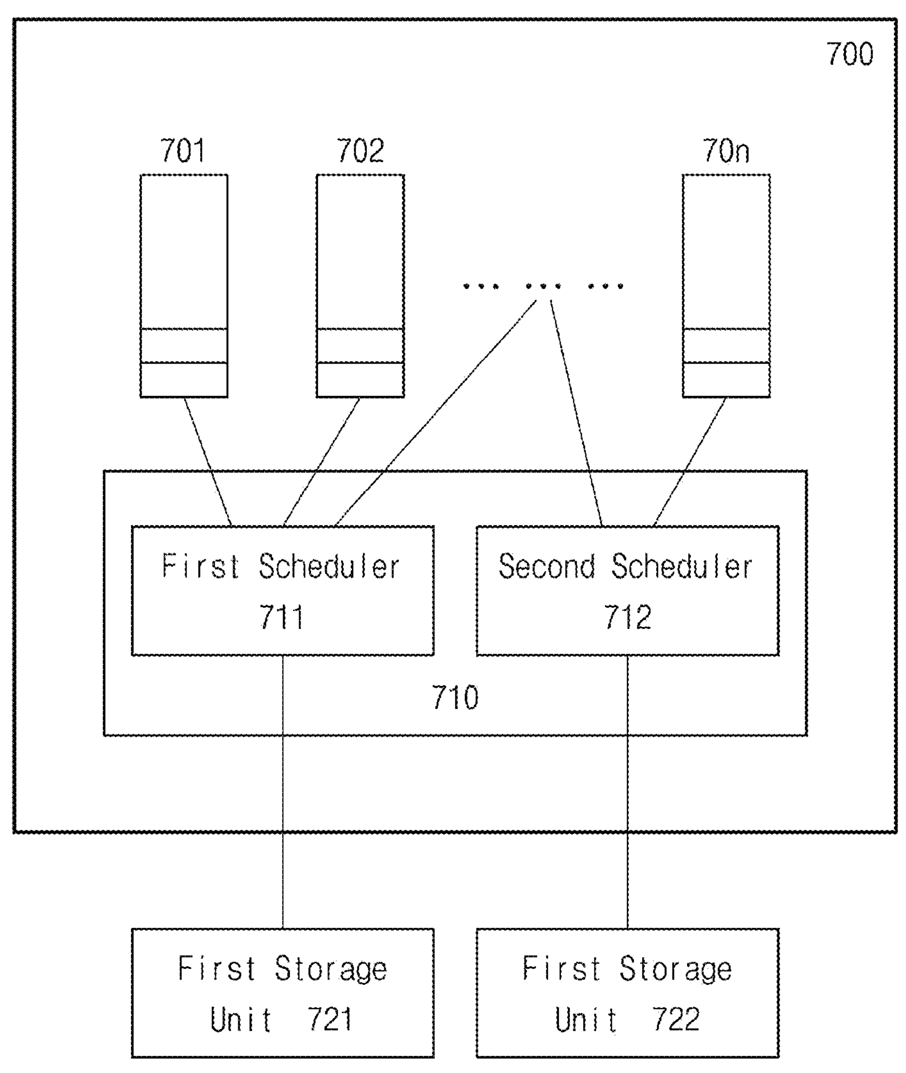
FIG. 7 is a block diagram illustrating a storage apparatus according to an embodiment of the present inventive concept.

FIG. 7 is a block diagram illustrating a storage apparatus according to an embodiment of the present inventive concept. In this embodiment, the storage apparatus may be a storage apparatus supporting multi-stream (Multi-Stream).

Referring to FIG. 7, a storage apparatus 700 includes a first storage unit 721 and a second storage unit 722, and a read and write performance of the first storage unit 721 may be higher than the read and write performance of the second storage unit 722. For example, the first storage unit 721 may be a storage class memory (SCM), and the second storage unit 722 may be a NAND flash memory. According to an embodiment of the present inventive concept, the storage apparatus 700 may further include a data writing unit 710. The data writing unit 710 may write data corresponding to an IO write request into the first storage unit 721 in response to a stream ID carried by the IO write request of a host satisfying a first preset condition, and write data corresponding to the IO write request into the second storage unit 722 in response to the stream ID carried by the IO write request satisfying a second preset condition. As described above, the stream ID indicates write latency requirement information of the data corresponding to the IO write request, and a data write latency indicated by the stream ID satisfying the first preset condition is less than the data write latency indicated by the stream ID satisfying the second preset condition. A data type associated with the stream ID satisfying the first preset condition may include: log data of a file system, Bitmap data of the file system, Inode data of the file system, log data of a user, and metadata of the user. A data type associated with the stream ID satisfying the second preset condition may include: application data of the user, other data of the file systems, and other user data.

As shown in FIG. 7, the data writing unit 710 may include a first scheduler 711 and a second scheduler 712. In response to the stream ID satisfying the first preset condition, the data writing unit 710 may write the IO write request into a first IO request queue, and write the data corresponding to the IO write request in the first IO request queue into the first storage unit by scheduling the first IO request queue via the first scheduler 711. In addition, in response to the stream ID satisfying the second preset condition, the data writing unit 710 may write the IO write request into a second IO request queue, and write the data corresponding to the IO write request in the second IO request queue into the second storage unit by scheduling the second IO request queue via the second scheduler 712.

Herein, the storage apparatus 700 may have a plurality of IO request queues 701, 702, . . . , 70*n*, *n* being an integer larger than 2. Each IO request queue among the plurality of IO request queues 701, 702, . . . , 70*n* has an unique ID, and each IO request queue may have an ID corresponding to an ID of the IO write request included therein. The ID of the IO write request may be determined by an application and/or a file system that generates the IO write request according to a type of data corresponding to the IO write request. According to an embodiment of the present inventive concept, the plurality of IO request queues 701, 702, . . . , 70*n* may be constructed in a such way: whenever the IO write request is received, the received IO write request may be added to a corresponding IO request queue among the plurality of IO request queues 701, 702, . . . , 70*n*. The plurality of IO request queues may be divided into the first IO request queue, which are scheduled by the first scheduler, and the second IO request queue, which are scheduled by the second scheduler according to the steam IDs.

According to an embodiment of the present inventive concept, the first scheduler 711 may monitor whether the first storage unit is full. In response to the first storage unit not being full, the first scheduler 711 may write the data corresponding to the IO write request in the first IO request queue which is polled currently into the first storage unit. In response to determining that the first storage unit is full, the first scheduler 711 may read migrated data from the first storage unit according to a preset rule, and writes the migrated data into the second IO request queue. In addition, in response to determining that the first storage unit is full, the second scheduler 712 may schedule the second IO request queue, and write the migrated data into the second storage unit. Here, the preset rule may be a least recently used (LRU) rule. In addition, the migrated data may be deleted from the first storage unit while the migrated data is written into the second storage unit.

In addition, the storage apparatus 700 may further include a weight allocator. The weight allocator may assign a corresponding weight to the IO write request in the first IO request queue based on the stream ID carried by the IO write request. For example, the higher a write latency requirement of the data corresponding to the IO write request indicated by the stream ID is, the greater the weight corresponding to the IO write request is. For example, the smaller the stream ID of the IO write request is, the larger its weight value is. After the corresponding weight is assigned to each IO write request in the first IO request queue, the first scheduler 711 may schedule the first IO request queue according to the weight in a round-robin manner. Here, since the stream IDs of the IO write requests included in each first IO request queues are the same, each first IO request queue may have a same weight as the IO write requests therein. In addition, the smaller the ID value of the IO write request included in the first IO request queue is, the greater the weight thereof is. The greater the weight of the first IO request queue, the more polling time slots allocated to the first IO request queue within a unit time is, and thus the first IO request queue is polled more times within a unit time. In addition, the second scheduler 712 may also poll a plurality of second IO request queues according to the weight of each second IO request queue. For example, the smaller the ID value of the IO write request included in the second IO request queue is, the greater the weight thereof is.

According to an embodiment of the present inventive concept, when writing the data corresponding to the IO write request in the first IO request queue which is polled currently into the first storage unit, the data writing unit 710 may monitor a depth of the first IO request queue. In response to the depth of the first IO request queue being greater than a preset depth value, the first scheduler 711 may write the IO write request whose write latency exceeds a preset latency value in the first IO request queue from the first IO request queue into the second IO request queue. Thereafter, the second scheduler 712 may schedule the second IO request queue, and write the data corresponding to the IO write request whose write latency exceeds the preset latency value (i.e., the IO write request written from the second IO request queue in the first IO request queue) into to the second storage unit.

According to an embodiment of the present inventive concept, the storage apparatus may further include a lookup unit, a first read IO request queue, a second read IO request queue, a first read unit, and a second read unit. The lookup unit may receive an IO read request sent from the host, and determine whether data corresponding to the IO read request is stored in the first storage unit or the second storage unit, by referring to a mapping table in a FTL based on address information contained in the IO read request. If the data corresponding to the IO read request is stored in the first storage unit, the lookup unit may add the IO read request to a first read IO request queue, and if the data corresponding to the IO read request is stored in the second storage unit, the lookup unit may add the IO read request to a second read IO request queue. The first read unit may read the corresponding data from the first storage unit based on the first IO read request in the first read IO request queue, and the second read unit may read the corresponding data from the second storage unit based on the second IO read request in the second read IO request queue.

Figure 8:
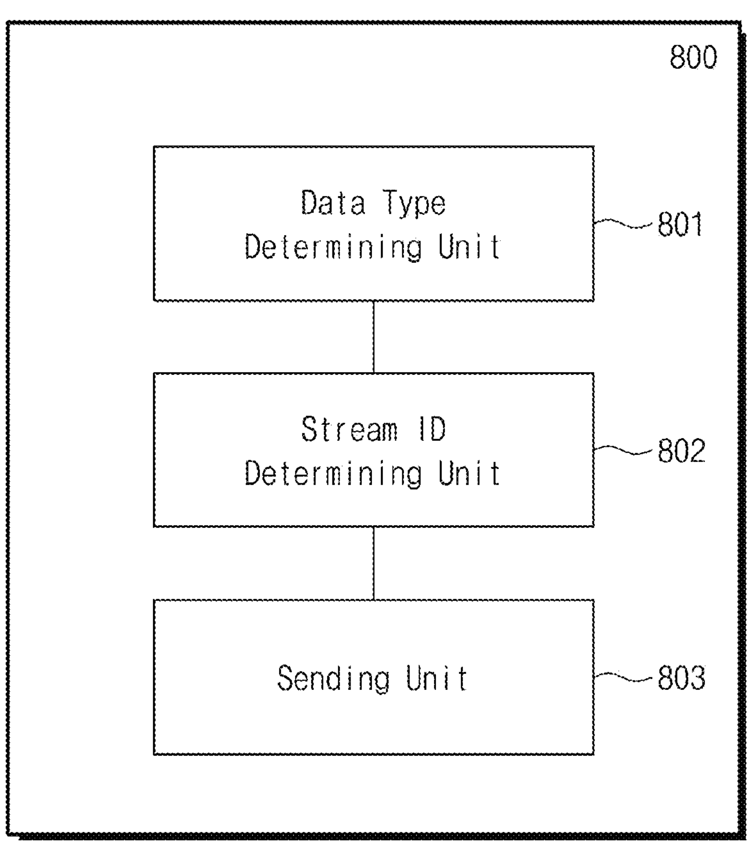
FIG. 8 is a block diagram illustrating a host according to an embodiment of the present inventive concept.

FIG. 8 is a block diagram illustrating a host according to an embodiment of the present inventive concept.

Referring to FIG. 8, the host may include a data type determining unit 801 (e.g., data type determining circuit), a stream ID determining unit 802 (e.g., stream ID determining circuit), and a sending unit 803 (e.g., sending circuit).

In response to an IO write request to be sent to a storage apparatus, the data type determining unit 80 determines a type of data corresponding to the IO write request. The stream ID determining unit 802 may determine a stream ID corresponding to the IO write request based on the type of the data. The sending unit 803 may send the IO write request carrying the stream ID to the storage apparatus, so that the storage apparatus stores data corresponding to the IO write request in a first storage unit when determining that the stream ID satisfies a first preset condition and stores the data corresponding to the IO write request in a second storage unit when determining that the stream ID satisfies a second preset condition. According to an embodiment of the present inventive concept, the stream ID indicates write latency requirement information of the data corresponding to the IO write request, and a data write latency indicated by the stream ID satisfying the first preset condition is less than the data write latency indicated by the stream ID satisfying the second preset condition. A read and write performance of the first storage unit may be higher than the read and write performance of the second storage unit.

According to an embodiment of the present inventive concept, a data type associated with the stream ID satisfying the first preset condition may include: log data of a file system, Bitmap data of the file system, Inode data of the file system, log data of a user, and metadata of the user. A data type associated with the stream ID satisfying the second preset condition may include: application data of the user, other data of the file systems, and other user data.

Figure 9:
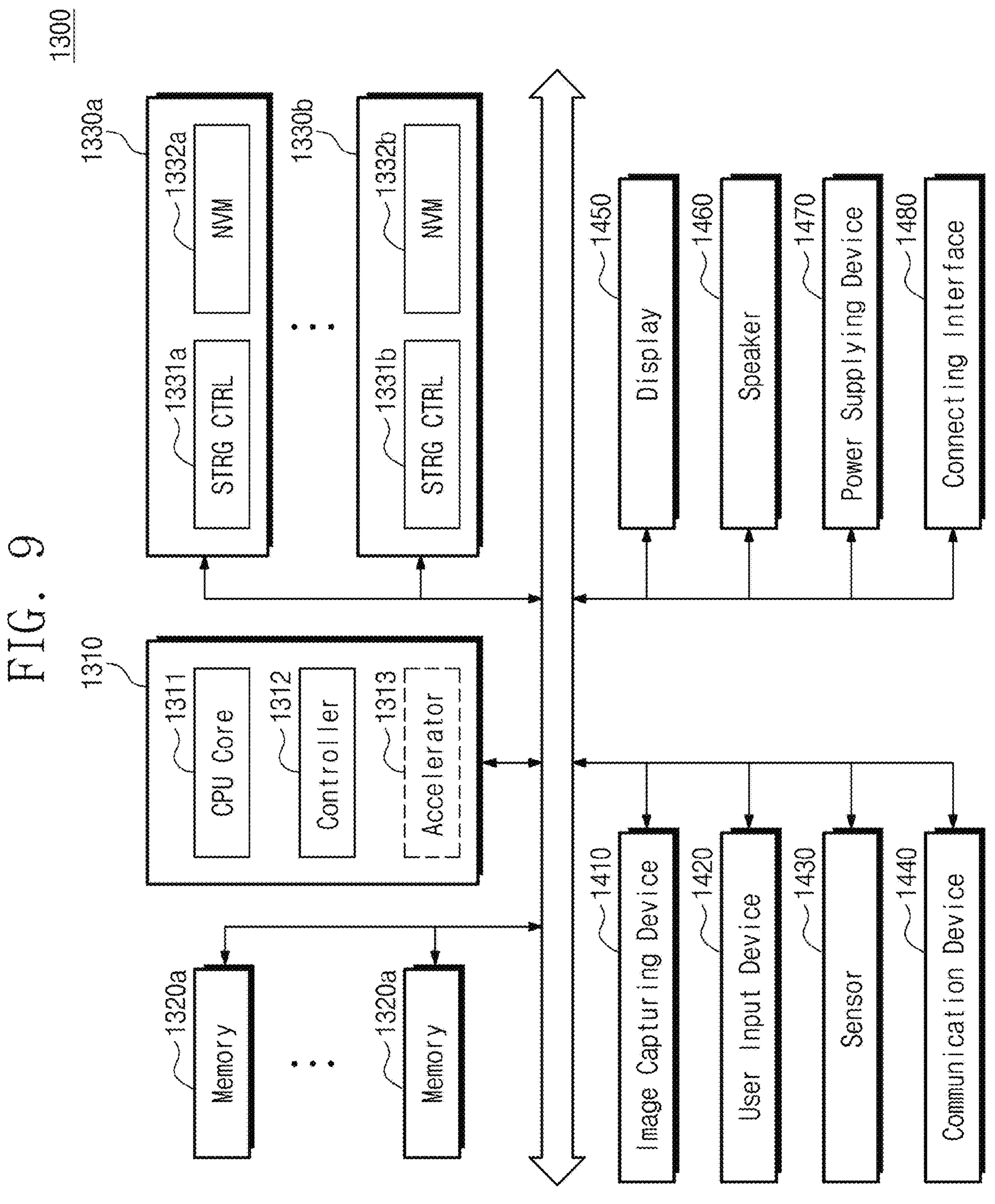
FIG. 9 is a schematic diagram illustrating an electronic system according to an embodiment of the present inventive concept.

FIG. 9 is a schematic diagram illustrating an electronic system according to an embodiment of the present inventive concept. The electronic system 1300 of FIG. 9 may basically be a mobile system, such as a portable communication terminal (e.g., a mobile phone), a smartphone, a tablet personal computer (PC), a wearable device, a healthcare device, or an Internet of things (IoT) device. However, the electronic system 1300 of FIG. 9 is not necessarily limited to the mobile system and may be a PC, a laptop computer, a server, a media player, or an automotive device (e.g., a navigation device).

Referring to FIG. 9, the electronic system 1300 may include a main processor 1310, memories (e.g., 1320*a* and 1320*b*), and storage devices (e.g., 1330*a* and 1330*b*). In addition, the electronic system 1300 may include at least one of an image capturing device 1410, a user input device 1420, a sensor 1430, a communication device 1440, a display 1450, a speaker 1460, a power supplying device 1470, and a connecting interface 1480.

The main processor 1310 may control all operations of the electronic system 1300. For example, the main processor 1310 may control operations of other components included in the electronic system 1300. The main processor 1310 may be implemented as a general-purpose processor, a dedicated processor, or an application processor.

The main processor 1310 may include at least one CPU core 1311 and further include a controller 1312 configured to control the memories 1320*a* and 1320*b* and/or the storage devices 1330*a* and 1330*b*. In an embodiment of the present inventive concept, the main processor 1310 may further include an accelerator 1313, which is a dedicated circuit for a high-speed data operation, such as an artificial intelligence (AI) data operation. The accelerator 1313 may include, for example, a graphics processing unit (GPU), a neural processing unit (NPU) and/or a data processing unit (DPU) and may be implemented as a chip that is physically separate from the other components of the main processor 1310.

The memories 1320*a* and 1320*b* may be used as main memory devices of the electronic system 1300. Although each of the memories 1320*a* and 1320*b* may include a volatile memory, such as static random access memory (SRAM) and/or dynamic RAM (DRAM), each of the memories 1320*a* and 1320*b* may include non-volatile memory, such as a flash memory, phase-change RAM (PRAM) and/or resistive RAM (RRAM). The memories 1320*a* and 1320*b* may be implemented in the same package as the main processor 1310.

The storage devices 1330*a* and 1330*b* may serve as non-volatile storage devices configured to store data regardless of whether power is supplied thereto, and have larger storage capacity than the memories 1320*a* and 1320*b*. The storage devices 1330*a* and 1330*b* may respectively include storage controllers (STRG CTRL) 1331*a* and 1331*b* and NVMs (Non-Volatile Memory) 1332*a* and 1332*b* configured to store data via the control of the storage controllers 1331*a* and 1331*b*. Although the NVMs 1332*a* and 1332*b* may include flash memories having a two-dimensional (2D) structure or a three-dimensional (3D) V-NAND structure, the NVMs 1332*a* and 1332*b* may include other types of NVMs, such as PRAM and/or RRAM.

The storage devices 1330*a* and 1330*b* may be physically separated from the main processor 1310 and included in the electronic system 1300, or may be implemented in the same package as the main processor 1310. In addition, the storage devices 1330*a* and 1330*b* may have types of solid-state devices (SSDs) or memory cards and may be removably combined with other components of the electronic system 1300 through an interface, such as the connecting interface 1480 that will be described below. The storage devices 1330*a* and 1330*b* may be devices to which a standard protocol, such as a universal flash storage (UFS), an embedded multi-media card (eMMC), or a non-volatile memory express (NVMe), is applied, without being limited thereto. At least one of storage devices 1330*a* and 1330*b* can be configured to perform the data storage method described with reference to FIG. 2.

The image capturing device 1410 may capture still images or moving images. The image capturing device 1410 may include a camera, a camcorder, and/or a webcam.

The user input device 1420 may receive various types of data input by a user of the electronic system 1300 and include a touch pad, a keypad, a keyboard, a mouse, and/or a microphone.

The sensor 1430 may detect various types of physical quantities, which may be obtained from the outside of the electronic system 1300, and convert the detected physical quantities into electric signals. The sensor 1430 may include, for example, a temperature sensor, a pressure sensor, an illuminance sensor, a position sensor, an acceleration sensor, a biosensor, and/or a gyroscope sensor.

The communication device 1440 may transmit and receive signals between other devices outside the electronic system 1300 according to various communication protocols. The communication device 1440 may include an antenna, a transceiver, and/or a modem.

The display 1450 and the speaker 1460 may serve as output devices configured to respectively output visual information and auditory information to the user of the electronic system 1300.

The power supplying device 1470 may appropriately convert power supplied from a battery embedded in the electronic system 1300 and/or an external power source, and supply the converted power to each of components of the electronic system 1300.

The connecting interface 1480 may provide connection between the electronic system 1300 and an external device, which is connected to the electronic system 1300 and is capable of transmitting and receiving data to and from the electronic system 1300. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 10:
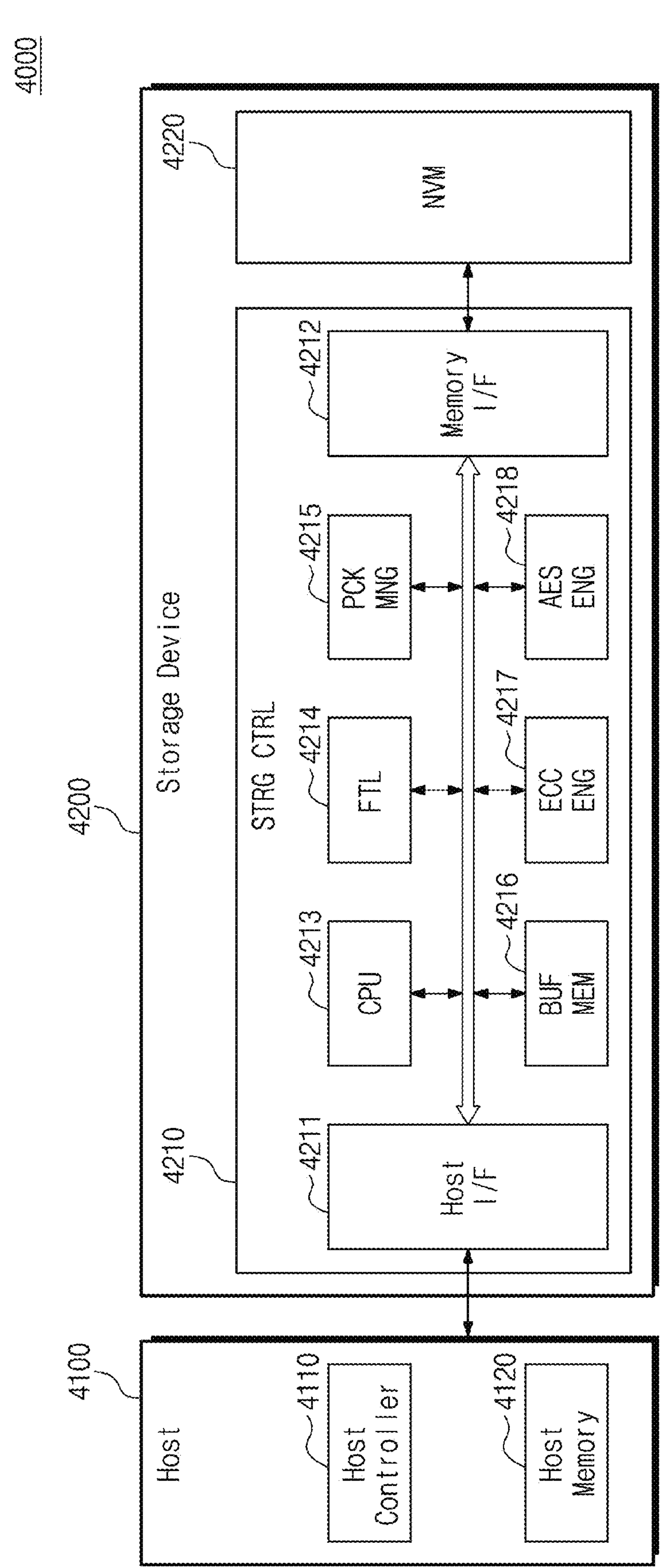
FIG. 10 a block diagram illustrating a host storage system according to an embodiment of the present inventive concept.

FIG. 10 a block diagram illustrating a host storage system according to an embodiment of the present inventive concept.

Referring to FIG. 10, the host storage system 4000 may include a host 4100 and a storage device 4200. Further, the storage device 4200 may include a storage controller 4210 and an NVM 4220. According to an embodiment of the present inventive concept, the host 4000 may include a host controller 4110 and a host memory 4120. The host memory 4120 may serve as a buffer memory configured to temporarily store data that is to be transmitted to the storage device 4200 or data that is received from the storage device 4200. The host 4000 can be configured to perform the data storage method described with reference to FIG. 6, and the storage device 4200 can be configured to perform the data storage method described with reference to FIG. 2.

The storage device 4200 may include storage media configured to store data in response to requests from the host 4100. As an example, the storage device 4200 may include at least one of an SSD, an embedded memory, and a removable external memory. When the storage device 4200 is an SSD, the storage device 4200 may be a device that conforms to an NVMe standard. When the storage device 4200 is an embedded memory or an external memory, the storage device 4200 may be a device that conforms to a UFS standard or an eMMC standard. Each of the host 4000 and the storage device 4200 may generate a packet according to an adopted standard protocol and transmit the packet.

When the NVM 4220 of the storage device 4200 includes a flash memory, the flash memory may include a 2D NAND memory array or a 3D (or vertical) NAND (VNAND) memory array. As another example, the storage device 4200 may include various other kinds of NVMs. For example, the storage device 4200 may include magnetic RAM (MRAM), spin-transfer torque MRAM, conductive bridging RAM (CBRAM), ferroelectric RAM (FRAM), PRAM, RRAM, and various other kinds of memories.

According to an embodiment of the present inventive concept, the host controller 4110 and the host memory 4120 may be implemented as separate semiconductor chips. In addition, in an embodiment of the present inventive concept, the host controller 4110 and the host memory 4120 may be integrated in the same semiconductor chip. As an example, the host controller 4110 may be any one of a plurality of modules included in an application processor (AP). The AP may be implemented as a System on Chip (SoC). Further, the host memory 4120 may be an embedded memory included in the AP or an NVM or memory module located outside the AP.

The host controller 4110 may manage an operation of storing data (e.g., write data) of a buffer region of the host memory 4120 in the NVM 4220 or an operation of storing data (e.g., read data) of the NVM 4220 in the buffer region.

The storage controller 4210 may include a host interface 4211, a memory interface 4212, and a CPU 4213. Further, the storage controllers 4210 may further include a flash translation layer (FTL) 4214, a packet manager 4215, a buffer memory 4216, an error correction code (ECC) engine 4217, and an advanced encryption standard (AES) engine 4218. The storage controllers 4210 may further include a working memory in which the FTL 4214 is loaded. The CPU 4213 may execute the FTL 4214 to control data write and read operations on the NVM 4220.

The host interface 4211 may transmit and receive packets to and from the host 4100. A packet transmitted from the host 4100 to the host interface 4211 may include a command or data to be written to the NVM 4220. A packet transmitted from the host interface 4211 to the host 4100 may include a response to the command or data read from the NVM 4220. The memory interface 4212 may transmit data that is to be written to the NVM 4220 to the NVM 4220 or receive data that is read from the NVM 4220. The memory interface 4212 may be configured to comply with a standard protocol, such as Toggle or open NAND flash interface (ONFI).

The FTL 4214 may perform various functions, such as an address mapping operation, a wear-leveling operation, and a garbage collection operation. The address mapping operation may be an operation of converting a logical address received from the host 4100 into a physical address used to actually store data in the NVM 4220. The wear-leveling operation may be a technique for preventing excessive deterioration of a specific block by allowing blocks of the NVM 4220 to be uniformly used. As an example, the wear-leveling operation may be implemented using a firmware technique that balances erase counts of physical blocks. The garbage collection operation may be a technique for ensuring usable capacity in the NVM 4220 by erasing an existing block after copying valid data of the existing block to a new block.

The packet manager 4215 may generate a packet according to a protocol of an interface, which consents to the host 4100, or parse various types of information from the packet received from the host 4100. In addition, the buffer memory 4216 may temporarily store data to be written to the NVM 4220 or data to be read from the NVM 4220. Although the buffer memory 4216 may be a component included in the storage controllers 4210, the buffer memory 4216 may be outside the storage controllers 4210.

The ECC engine 4217 may perform error detection and correction operations on read data read from the NVM 4220. For example, the ECC engine 4217 may generate parity bits for write data to be written to the NVM 4220, and the generated parity bits may be stored in the NVM 4220 together with write data. During the reading of data from the NVM 4220, the ECC engine 4217 may correct an error in the read data by using the parity bits read from the NVM 4220 along with the read data, and output error-corrected read data.

The AES engine 4218 may perform at least one of an encryption operation and a decryption operation on data input to the storage controllers 4210 by using a symmetric-key algorithm.

Figure 11:
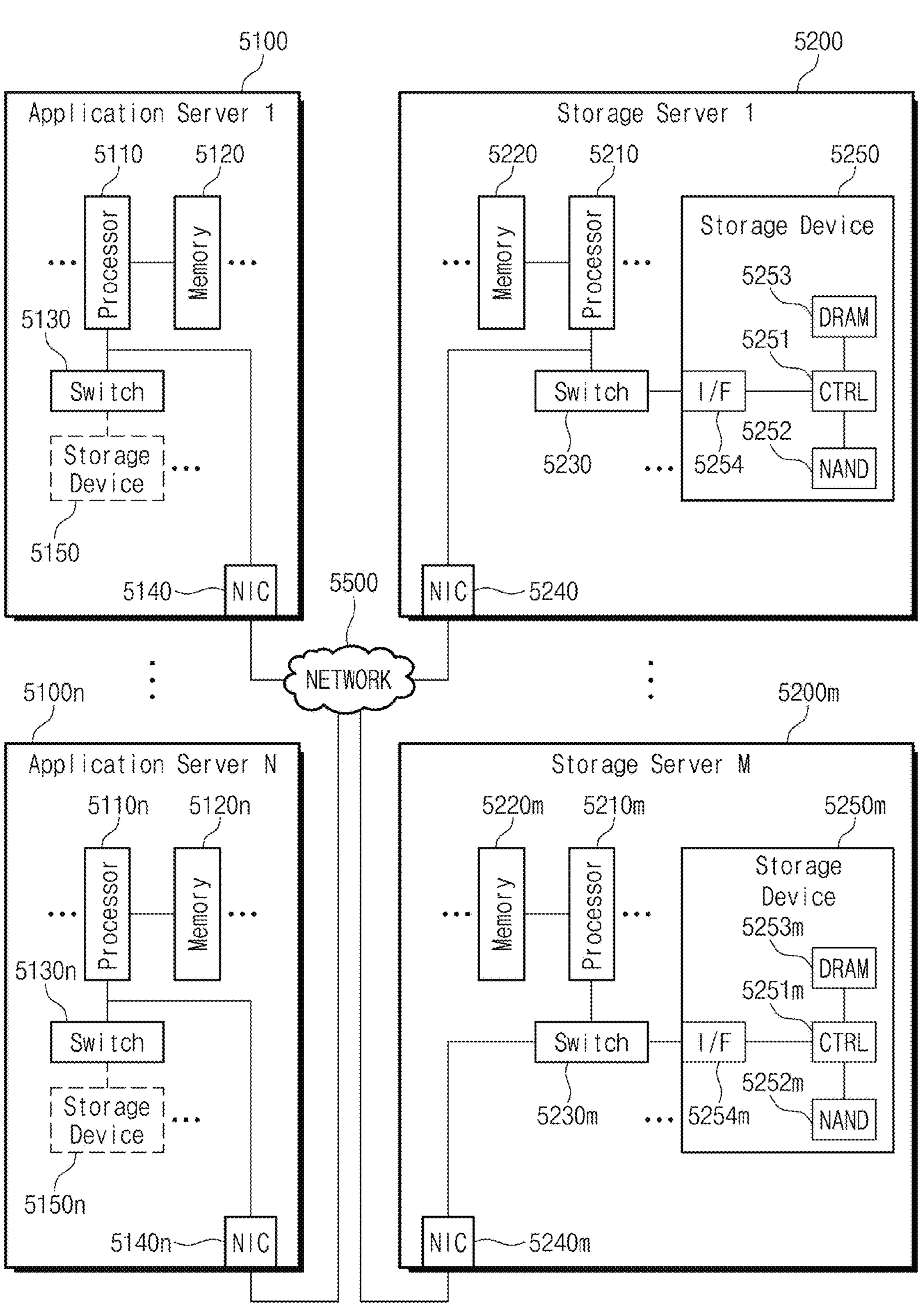
FIG. 11 a schematic diagram illustrating a data center according to an embodiment of the present inventive concept.

FIG. 11 a schematic diagram illustrating a data center according to an embodiment of the present inventive concept.

Referring to FIG. 11, the data center 5000 may be a facility that collects various types of pieces of data and provides services and may be referred to as a data storage center. The data center 5000 may be a system for operating a search engine and a database, and may be a computing system used by companies, such as banks, or government agencies. The data center 5000 may include application servers 5100 to 5100*n* and storage servers 5200 to 5200*m*. The number of application servers 5100 to 5100*n* and the number of storage servers 5200 to 5200*m* may be variously selected according to embodiments. The number of application servers 5100 to 5100*n* may be different from the number of storage servers 5200 to 5200*m*. The application servers 5100 to 5100*n* can be configured to perform the data storage method described with reference to FIG. 6, and the storage servers 5200 to 5200*m* can be configured to perform the data storage method described with reference to FIG. 2.

The application server 5100 or the storage server 5200 may include at least one of processors 5110 and 5210 and memories 5120 and 5220. The storage server 5200 will now be described as an example. The processor 5210 may control all operations of the storage server 5200, access the memory 5220, and execute instructions and/or data loaded in the memory 5220. The memory 5220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In an embodiment of the present inventive concept, the numbers of processors 5210 and memories 5220 included in the storage server 5200 may be variously selected. In an embodiment of the present inventive concept, the processor 5210 and the memory 5220 may provide a processor-memory pair. In an embodiment of the present inventive concept, the number of processors 5210 may be different from the number of memories 5220. The processor 5210 may include a single-core processor or a multi-core processor. The above description of the storage server 5200 may be similarly applied to the application server 5100. In an embodiment of the present inventive concept, the application server 5100 might not include a storage device 5150. The storage server 5200 may include at least one storage device 5250. The number of storage devices 5250 included in the storage server 5200 may be variously selected according to embodiments.

The application servers 5100 to 5100*n* may communicate with the storage servers 5200 to 5200*m* through a network 5500. The network 5500 may be implemented by using a fiber channel (FC) or Ethernet. In this case, the FC may be a medium used for relatively high-speed data transmission and may use an optical switch with high performance and high availability. The storage servers 5200 to 5200*m* may be provided as file storages, block storages, or object storages according to an access method of the network 5500.

In an embodiment of the present inventive concept, the network 5500 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In an embodiment of the present inventive concept, the network 5500 may be a general network, such as a TCP/IP network. For example, the network 5500 may be implemented according to a protocol, such as FC over Ethernet (FCoE), network attached storage (NAS), and NVMe over Fabrics (NVMe-oF).

Hereinafter, the application server 5100 and the storage server 5200 will mainly be described. A description of the application server 5100 may be applied to another application server 5100*n*, and a description of the storage server 5200 may be applied to another storage server 5200*m*.

The application server 5100 may store data, which is requested by a user or a client to be stored, in one of the storage servers 5200 to 5200*m* through the network 5500. In addition, the application server 5100 may obtain data, which is requested by the user or the client to be read, from one of the storage servers 5200 to 5200*m* through the network 5500. For example, the application server 5100 may be implemented as a web server or a database management system (DBMS).

The application server 5100 may access a memory 5120*n* of a storage server 5200*m* or a storage device 5150*n*, which is included in another application server 5100*n*, through the network 5500. In addition, the application server 5100 may access memories 5220 to 5220*m* or storage devices 5250 to 5250*m*, which are included in the storage servers 5200 to 5200*m*, through the network 5500. Thus, the application server 5100 may perform various operations on data stored in application servers 5100 to 5100*n* and/or the storage servers 5200 to 5200*m*. For example, the application server 5100 may execute an instruction for moving or copying data between the application servers 5100 to 5100*n* and/or the storage servers 5200 to 5200*m*. In this case, the data may be moved from the storage devices 5250 to 5250*m* of the storage servers 5200 to 5200*m* to the memories 5120 to 5120*n* of the application servers 5100 to 5100*n* directly or through the memories 5220 to 5220*m* of the storage servers 5200 to 5200*m*. The data moved through the network 5500 may be data encrypted for security or privacy.

The storage server 5200 will now be described as an example. An interface 5254 may provide physical connection between a processor 5210 and a controller 5251 and a physical connection between a network interface card (NIC) 5240 and the controller 5251. For example, the interface 5254 may be implemented using a direct attached storage (DAS) scheme in which the storage device 5250 is directly connected with a dedicated cable. For example, the interface 5254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 5200 may further include a switch 5230 and the NIC (Network InterConnect) 5240. The switch 5230 may selectively connect the processor 5210 to the storage device 5250 or selectively connect the NIC 5240 to the storage device 5250 via the control of the processor 5210.

In an embodiment of the present inventive concept, the NIC 5240 may include a network interface card and a network adaptor. The NIC 5240 may be connected to the network 5500 by a wired interface, a wireless interface, a Bluetooth interface, or an optical interface. The NIC 5240 may include an internal memory, a digital signal processor (DSP), and a host bus interface and be connected to the processor 5210 and/or the switch 5230 through the host bus interface. The host bus interface may be implemented as one of the above-described examples of the interface 5254. In an embodiment of the present inventive concept, the NIC 5240 may be integrated with at least one of the processor 5210, the switch 5230, and the storage device 5250.

In the storage servers 5200 to 5200*m* or the application servers 5100 to 5100*n*, a processor may transmit a command to storage devices 5150 to 5150*n* and 5250 to 5250*m* or the memories 5120 to 5120*n* and 5220 to 5220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 5150 to 5150*n* and 5250 to 5250*m* may transmit a control signal and a command/address signal to NAND flash memory devices 5252 to 5252*m* in response to a read command received from the processor 5210 to 5210*m*. Thus, when data is read from the NAND flash memory devices 5252 to 5252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 5251 may control all operations of the storage device 5250. In an embodiment of the present inventive concept, the controller 5251 may include SRAM. The controller 5251 may write data to the NAND flash memory device 5252 in response to a write command or read data from the NAND flash memory device 5252 in response to a read command. For example, the write command and/or the read command may be provided from the processor 5210 of the storage server 5200, the processor 5210*m* of another storage server 5200*m*, or the processors 5110 and 5110*n* of the application servers 5100 and 5100*n*. DRAM 5253 may temporarily store (or buffer) data to be written to the NAND flash memory device 5252 or data read from the NAND flash memory device 5252. In addition, the DRAM 5253 may store metadata. Here, the metadata may be user data or data generated by the controller 5251 to manage the NAND flash memory device 5252. The storage device 5250 may include a secure element (SE) for security or privacy.

In the data storage method, the storage apparatus and the host according to an embodiment of the present inventive concept, the storage apparatus (for example, SSD) may consist of a SCM and a NAND flash memory. A write latency $T_{SCM}$ of the SCM is one tenth of the write latency $T_{Flash}$ of the NAND flash memory. Taking a database (such as RocksDB) application as an example, in a write operation, the write latency is a sum of a WAL write latency $T_{WAL}$ and a memory write latency $T_{Memory}$. The write latency of a memory is very small compared to that of a non-volatile memory, and thus an overall write latency of data can be approximated as $T_{WAL}$. If the WAL is written into the SCM, one tenth of the write latency for writing into the NAND flash memory can be obtained, which can greatly reduce the write latency. Since data writing will be performed in a certain order, new data will be written after old data is written. When it does not reach a bandwidth bottleneck that the written data is flushed into the NAND flash memory, a data throughput is a reciprocal of the write latency, that is, the data throughput can be increased by about 10 times.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While the present inventive concept has been particularly shown and described with reference to example embodiments thereof, it will be apparent to those of ordinary skill in the art that various changes in form and detail may be made thereto without departing from the spirit and scope of the present inventive concept.

What is claimed is:

1. A host comprising:

a data type determining unit configured to: determine a type of data corresponding to an Input/Output (IO) write request to a storage apparatus, wherein the storage apparatus includes a first storage unit and a second storage unit configured to support multi-stream;

a stream identifier (ID) determining unit configured to: determine a stream ID corresponding to the IO write request based on the type of the data; and a transmission unit configured to: send the IO write request carrying the stream ID to the storage apparatus, the IO write request indicating for the storage apparatus to store data corresponding to the IO write request in the first storage unit in response to determining that the stream ID meets a first condition and to store the data corresponding to the IO write request in the second storage unit in response to determining that the stream ID meets a second condition, wherein the stream ID indicates data write latency of the data corresponding to the IO write request, wherein a first data write latency meeting the first condition is less than a second data write latency meeting the second condition, and wherein the first storage unit has higher read and write performance than the second storage unit.

2. The host of claim 1, wherein the stream ID includes a first stream ID and a second stream ID, and wherein the first data write latency is indicated by the first stream ID and the second data write latency is indicated by the second stream ID.

3. The host of claim 1, wherein a data type associated with the stream ID determined to meet the first condition includes: log data of a file system, Bitmap data of the file system, Inode data of the file system, log data of a user, and metadata of the user, and wherein a data type associated with the stream ID determined to meet the second condition includes: application data of the user, other data of the file system, and other user data.

4. The host of claim 1, wherein the IO write request includes a first write IO request and a second write IO request, further comprising an application configured to generate a first write data and the first write IO request corresponding to the first write data.

5. The host of claim 4, further comprising:

a file system configured to generate a second write data, and generate the second write IO request corresponding to the second write data.

6. The host of claim 5, wherein the application is configured to generate an ID value of the first write IO request based on a type of the first write data, and wherein the file system is configured to generate an ID value of the second write IO request based on a type of the second write data.

7. The host of claim 6, wherein the file system sets the ID value of the first write data as a default value, when the ID value of the first write data has not been determined by the application.

8. The host of claim 7, wherein:

the ID value of the first write IO request is within a first range;

the ID value of the second write IO request is within a second range; and the ID value of the first write IO request is smaller than the ID value of the second write IO request.

9. An operation method of a host comprising:

generating a write data and a write Input/Output (IO) request corresponding to the write data;

determining a type of data corresponding to an IO write request to be sent to a storage apparatus;

determining a stream identifier (ID) corresponding to the IO write request, based on the type of the data; and sending the IO write request carrying the stream ID to the storage apparatus, the storage apparatus including a first storage unit and a second storage unit;

wherein the IO write request indicates for the storage apparatus to store data corresponding to the IO write request in the first storage unit in response to determining that the stream ID meets a first condition and to store the data corresponding to the IO write request in the second storage unit in response to determining that the stream ID meets a second condition, wherein the stream ID indicates data write latency of the data corresponding to the IO write request, wherein a first data write latency meeting the first condition is less than a second data write latency meeting the second condition, and wherein the first storage unit has higher read and write performance than the second storage unit.

10. The operation method of claim 9, wherein the stream ID includes a first stream ID and a second stream ID, and wherein the first data write latency is indicated by the first stream ID and the second data write latency is indicated by the second stream ID.

11. The operation method of claim 9, wherein a data type associated with the stream ID determined to meet the first condition includes: log data of a file system, Bitmap data of the file system, Inode data of the file system, log data of a user, and metadata of the user, and wherein a data type associated with the stream ID determined to meet the second condition includes: application data of the user, other data of the file system, and other user data.

12. The operation method of claim 9, wherein:

the write data includes a first write data and a second write data;

the write IO request includes a first IO request corresponding to the first write data and a second IO request corresponding to the second write data; and the host includes an application configured to generate the first write data and the second write data.

13. The operation method of claim 12, wherein the host includes a file system configured to generate the second write data and a second write IO request.

14. A host storage system comprising:

a host; and a storage apparatus, wherein the storage apparatus comprises a first storage unit and a second storage unit and supports multi-stream;

wherein the storage apparatus is configured to perform:

in response to a stream identifier (ID) carried by an Input/Output (IO) write request of a host satisfying a first condition, writing data corresponding to the IO write request into the first storage unit of a storage apparatus; and in response to the stream ID carried by the IO write request satisfying a second condition, writing the data corresponding to the IO write request into the second storage unit of the storage apparatus, wherein a first data write latency meeting the first condition is less than a second data write latency meeting the second condition, and wherein the first storage unit has higher read and write performance than the second storage unit.

15. The host storage system of claim 14, wherein the stream ID includes a first stream ID and a second stream ID, and wherein the first data write latency is indicated by the first stream ID and the second data write latency is indicated by the second stream ID.

16. The host storage system of claim 14, wherein a data type associated with the stream ID determined to meet the first condition includes: log data of a file system, Bitmap data of the file system, Inode data of the file system, log data of a user, and metadata of the user, and wherein a data type associated with the stream ID determined to meet the second condition includes: application data of the user, other data of the file system, and other user data.

17. The host storage system of claim 14, wherein the writing the data corresponding to the IO write request into the first storage unit includes:

in response to the stream ID satisfying the first condition, writing the IO write request into a first IO request queue, and writing the data corresponding to the IO write request into the first storage unit by scheduling the first IO request queue via a first scheduler, and wherein the writing the data corresponding to the IO write request into the second storage unit includes:

in response to the stream ID satisfying the second condition, writing the IO write request into a second IO request queue, and writing the data corresponding to the IO write request into the second storage unit by scheduling the second IO request queue via a second scheduler.

18. The host storage system of claim 17, wherein the storage apparatus is further configured to perform:

in response to the first storage unit being full, reading migrated data from the first storage unit according to a rule and writing the migrated data into the second IO request queue via the first scheduler; and writing the migrated data into the second storage unit by scheduling the second IO request queue via the second scheduler.

19. The host storage system of claim 17, wherein the first storage unit includes a storage class memory (SCM), and the second storage unit includes a NAND flash memory.

20. The host storage system of claim 14, wherein the host is configured to:

generate a write data and the IO write request;

in response to the IO write request that is to be sent to the storage apparatus, determine a type of data corresponding to the IO write request; and determine the stream ID corresponding to the IO write request, based on the type of the data.

* * * * *